UNITED STATES PATENT OFFICE

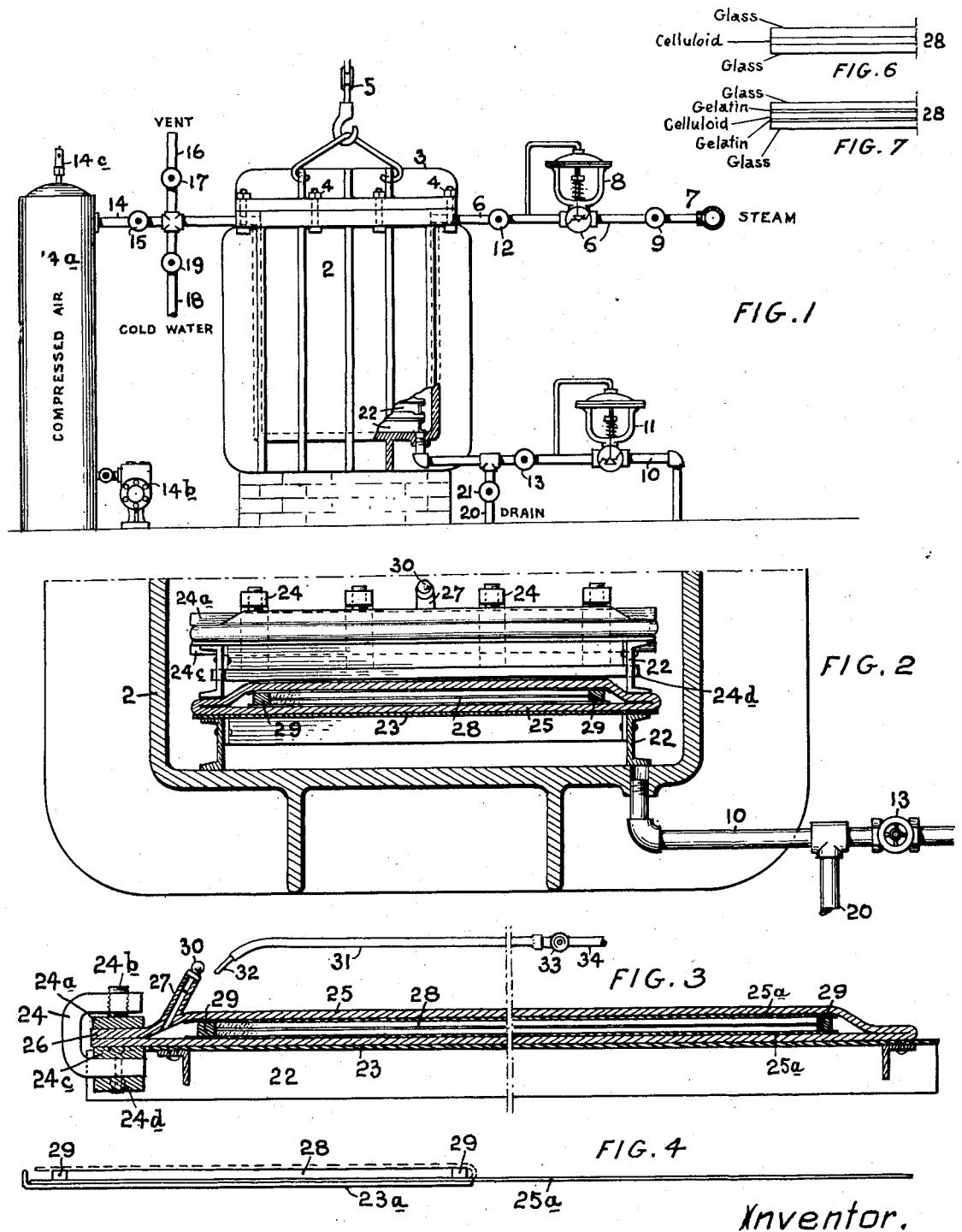

ARTHUR G. WORRALL, OF PHILADELPHIA, PENNSYLVANIA, ASSIGNOR TO LOUIS J. KOLB, OF PHILADELPHIA, PENNSYLVANIA, TRADING AS SAFETEE GLASS COMPANY

METHOD AND MEANS FOR MAKING LAMINATED GLASS

Application filed August 17, 1928. Serial No. 300,173.

My invention has for its object a commercially efficient method and means for the rapid manufacture of laminated glass.

More particularly, my invention is intended to provide a simple and inexpensive form of apparatus adapted for carrying out the process for thoroughly uniting the layers of glass to the interposed sheet of celluloid or pyroxylin material, insuring the removal of all air, vapors and moistures which may have been present between the several layers of the "sandwich"; and further, to also insure adequate heat and pressure to be applied to cause a thorough welding of the layers to each other without breakage.

In putting my improved method into practice, I enclose the glass and celluloid "sandwich" within a flat bag or receptacle of rubber or other suitable flexible material, and temporarily seal the same against the entrance of air; thereafter exhausting the air, vapor and moisture from within the bag or receptacle and maintaining therein a suitable vacuum and thereby the flexible walls of the bag to lie in close contact with the outer surfaces of the glass. The bag with its contained glass and celluloid "sandwich" is then placed within a closed pot or chamber capable of withstanding considerable pressure, and the lid or cover thereof having been firmly secured in place, steam at a pressure of approximately fifteen pounds (having a temperature of 250 degrees F.) is admitted and allowed to bring the bag and its enclosed "sandwich" to a temperature of 240 degrees F. or thereabouts, said temperature being maintained for a time sufficient to enable the celluloid or binder material between the glass sheets to become pliable and more or less plastic.

Following the above described operation, the steam supply is shut off and the bag and its contents subjected to a pressure of approximately 160 lbs. by admission of compressed air to the closed pot or chamber, said pressure being maintained for a few minutes to complete the weld. The result of the treatment just described is that the celluloid or binder layer is thoroughly compressed between the glass surfaces and made to conform closely thereto so that said surfaces are in perfect contact and leave no spaces or crevices for the subsequent entrance of air. The compressed air is preferably applied for approximately three to five minutes and is then shut off and the pot vented to remove the pressure. Thereupon, a cooling fluid, preferably water, is admitted to the pot and about the vacuum bag and its contents to cool the same with reasonable rapidity to permit the pot to be opened and the contents removed without inconvenience. Air is then admitted to the bag or receptacle to remove atmospheric pressure from the glass "sandwich", which may then be withdrawn from the bag in its completed form. Thereafter, it is only necessary to grind the edges when required to provide a finished appearance to the product.

In carrying out the above stated process, it is desirable that certain refinements thereof be employed, and among these may be mentioned that during the application of the steam pressure to the vacuum bag and its contents within the pot, it is desirable that the steam should be admitted under automatic control at a pressure of 15 lbs. with an approximate temperature of 250 degrees F., while at the same time the outlet for water of condensation and air is also automatically controlled to maintain a back pressure of approximately 10 lbs. at the outlet, whereby there is a pressure differential of approximately 5 lbs. between the inlet and outlet of the pot.

By maintaining a pressure differential for the steam between the inlet and outlet of the pot, there is insured a definite circulation of steam over and about the vacuum bag or enclosure for the "sandwich", resulting in a rapid, thorough and uniform heating thereof; and whereas the preferred differential of 5 lbs. is 30% of the maximum steam pressure, the temperature differential amounts to only 10 degrees F. or 2½% of the temperature of the initial steam supply, and consequently the temperature conditions within the pot are approximately uniform.

My invention comprehends other details in method and apparatus which, together with those above referred to, are fully described hereinafter and pointed out in the claims.

My improvements will be better understood by reference to the drawing, in which: Fig. 1 is a diagrammatic elevation of an apparatus having a construction suitable for the carrying out of my improved process; Fig. 2 is a transverse vertical sectional view through the lower part of the pot structure enclosing the vacuum bags in position therein; Fig. 3 is a longitudinal vertical sectional view of one of the vacuum bags, charged with the "sandwich" and positioned upon its support ready for insertion in the pot; Fig. 4 is a diagram illustrating a side view of means for inserting the "sandwich" into the bag; Fig. 5 is a vertical sectional view of a modified construction of bag support within the pot; and Figs. 6 and 7 are edge views of two forms of laminated glass to be made by my improved method and means.

2 illustrates a strong pot or chamber having a closure or lid 3 preferably arranged at the top and adapted to be secured to the pot by suitable clamping bolts 4. This cover or lid may be raised or lowered by suitable hoisting means 5 whereby it may be removed when inserting or withdrawing the contents to and from the pot. I do not restrict myself to any particular size or construction of the pot beyond the fact that it should be of sufficient strength to resist bursting under pressure of 160 lbs. per square inch or thereabouts, which pressure is applied as hereinafter described.

A steam supply pipe 6, having communication with the upper portion of the pot 2, may receive steam from any suitable source such as main 7, which steam may be admitted or shut off by a valve 9. The pipe 6 is provided with a pressure reducing valve 8 of any usual construction which is so positioned and adjusted that it will maintain on its delivery side and in the pot a steam pressure of approximately 15 lbs. per square inch. It will not be necessary to describe any particular form of the pressure reducing valve 8 inasmuch as valves of this character are well known in the commercial market. A shut-off valve 12 may be arranged upon the pipe 6 and close to the pot, so as to avoid any undue pressure upon the pressure reducing valve 8 when the pot is later subjected to the higher pressure previously referred to.

The lower part of the pot 2 is provided with an exhaust or discharge pipe 10 for water of condensation, air and steam, preferably caused to pass through the automatic pressure relief valve 11 arranged in said pipe and adjusted to permit the escape of steam (as well as water and air) when the outlet pressure exceeds 10 lbs. (corresponding to a temperature of 240 degrees F.), or at any other pressure less than the initial steam pressure delivered to the pot, as may be preferred, the same being assured by proper adjustment of the automatic relief valve. A hand valve 13 may be arranged in the pipe 10 between the automatic valve 11 and the pot, whereby the higher pressure later to be delivered to the pot may be prevented from acting upon the mechanism of the pressure controlling valve 11. 20 is a drain pipe which may communicate with the pipe 10 between its valve 13 and the pot and is controlled by a valve 21.

14 is a compressed air pipe and is connected into the upper part of the pot 2 and communicates with a source or tank of compressed air 14a having a pressure of approximately 160 lbs. to the square inch, the said source being maintained by air compressor 14b and a relief valve 14c. The compressed air flowing through the said pipe 14 to the pot may be controlled by a valve 15. Opening upward from the pipe 14 is a vent pipe 16 which is provided with a valve 17. In addition to the vent pipe, a cold water pipe 18 may also be connected with the pipe 14 between its valve 15 and the pot, and said water pipe 18 is provided with a control valve 19. In this manner, compressed air may be supplied to the pot or vented therefrom. Similarly, water may be supplied to the pot and subsequently drained therefrom by the drain pipe 20.

Referring now to the vacuum bag construction constituting the receptacle or enclosure in which the glass and celluloid "sandwich" is placed during the treatment: 23 is a rectangular supporting frame or tray providing a supporting surface and side channel frames 22 and also having at one end a suitable clamping means 24. 25 is a rectangular bag preferably having a greater length than width and composed of a rubber and textile fabric for flexibility, lightness and strength and having one end open as at 26. Extending from the bag near the open end is an exhaust tube 27 through which the air and vapor contents of the bag may be exhausted and the tube subsequently plugged, as indicated at 30 in Fig. 3.

28 represents the "sandwich" of glass and celluloid in position within the bag, and 29 are templets or non-compressible strips arranged about the perimeter of the "sandwich" to prevent excessive pressure coming upon the edges of the glass. For conveniently inserting the "sandwich" or "sandwiches" into the bag, I proceed as follows: Upon a thin steel plate 23a (Fig. 4) of approximately the full width of the interior of the bag, I spread a long strip of light canvas 25a and upon this and above the plate, I arrange the "sandwich" or "sandwiches" and templets, and then fold the remaining portion of the canvas over the "sandwich" and templets above the plate, as indicated in dotted lines in Fig. 4. The plate 23a with its load is then inserted through the mouth 26 of the bag 25 and moved backward therein until the parts are entirely within the bag and at some distance from the open end thereof. Without disturbing the "sandwich" or templets, I next gently withdraw the thin steel plate 23a alone, thereby leaving the "sandwich" structures, templets, and enclosing canvas in proper position within the bag.

While I have shown within the bag one laminated plate of relatively large size, it will be understood that the areas of these may vary according to the requirements of the article, sometimes being rectangular or circular and otherwise shaped according to its subsequent or intended use. The bag may, therefore, be practically filled with "sandwich" sets of glass and celluloid, according to its capacity and the relative sizes of the articles.

After being loaded with the "sandwich" structures, the end layers 26 of the open end of the bag are placed between clamping plate 24a and the plate 24c of the clamp 24 (hinged to the table frame at 24d), and said plates 24a and 24c are respectively pressed tightly upon the layers of the open end of the bag as shown at 26, by means of clamping screws 24b, so as to hermetically seal the entrance to the bag. When this is accomplished and the plug 30 removed, the nipple 32 of vacuum tube 31 is inserted in place of the plug and thereafter the valve 33 is opened and the vacuum existing in pipe 34 acts to withdraw all of the air, vapor, moisture or other volatile substances from the bag and from between the plates of the "sandwich"; and aside from exhausting the air, vapor and moisture from the bag, the vacuum also causes the flexible top and bottom layers of the bag to press tightly upon the outer surfaces of the glass sheets for holding them firmly upon the intermediate celluloid or binder layer of the "sandwich". When the bag has been thoroughly exhausted, the nipple 32 may be withdrawn from exhaust tube 27 of the bag, and the plug 30 quickly inserted so that the vacuum within the bag may be maintained during the remaining operations of the process.

When the table frame 22 is loaded with the bag and its contents ready for insertion within the pot and is lowered therein and rests upon the bottom, a similar second table frame and vacuum bag with its contents is placed within the pot immediately above the frame and bag first inserted, and similarly, any number of additional frames and bags with their contents may be stacked one above the other, according to the requirements or quantity of work to be done. Assuming, however, that the pot has been fully charged, it will be noted that the bags and table frames supporting them do not extend to the sides or ends of the pot, but are open on all sides, top and bottom, so as to permit free access of the steam, air and water to be employed in carrying on the process. If the bags are made in width substantially equal to the width of the table plate 23, the side portions of the frames 22 of said table may rest directly upon the side portions of the bag, as shown in Fig. 2. I, however, do not limit myself in this respect, as the bags may be of less width than the distance apart of the longitudinal side portions of the frame 22, so as to extend between said portions but without having them rest directly upon the bag, as indicated in Fig. 5. After the pot is fully charged, the lid or cover 3 is lowered and tightly clamped into position.

To facilitate the circulation of the steam in the heating of the bag enclosure 25, the tray or table plate 23 and the side frames 22 may be perforated to constitute open-work, as indicated in Fig. 5, but I do not restrict myself in this respect.

When the pot is sealed, the valves 9, 12 and 13 are opened, and thereupon steam will enter the pot at its upper part under a pressure of approximately 15 lbs. and at a temperature of 250 degrees F. The supply of steam is continued for approximately twenty minutes. During this time, the water of condensation, air and some steam is permitted to flow out through pipe 10 and control relief valve 11. The latter permits the escape of steam that may exist at the outlet at a pressure below 15 lbs. and a temperature of approximately 240 degrees F. In this way, the steam is caused to circulate through the pot and reach the bags from all sides so that the contents thereof are subjected to a temperature of between 240 and 250 degrees F. If no steam was allowed to circulate through the discharge pipe 10, the entrance of live steam into the pot at the inlet would be restricted to a rate commensurate to the condensation only and would, under those conditions, be very slow in heating the contents in the pot; and moreover, would cause relatively under-heating for the contents of the lower bags as compared to that of the upper bags. When, however, the steam is permitted to circulate entirely through the pot, and pass into the escape pipe 10 at a pressure and temperature somewhat less than that of the steam entering at the top of the pot, the heating is positive, more uniform, and greatly more rapid, with the result that the time required in practicing the process is shortened and thereby insures greater capacity to the apparatus.

While I have stated that it is desirable to subject the loaded bags to a temperature treatment for approximately twenty minutes, to soften the celluloid or pyroxylin, I do not restrict myself in this respect. I have found, however, that in practice this period of time is effective with the average character of materials employed and with the vacuum bags or enclosures of substantial construction.

By reason of the vacuum within the bags, the walls thereof are held in contact with the glass surfaces very closely and under a pressure approximately equal to or greater than 15 lbs. per square inch (partly due to the initial pressure of the live steam admitted to the pot), and consequently the conduction of the heat from the live steam through the bag and glass to the celluloid or binder of the "sandwich" is effective and rapid in action.

When the proper heating has been accomplished, it is necessary to apply a much greater pressure than that provided by steam, for insuring the proper shaping of the celluloid or pyroxylin between the glass plates, all of which must be done before the "sandwich" cools. The desired result is speedily obtained by closing the steam valves 12 and 13 and opening valve 15; whereupon compressed air, of approximately 160 lbs. per square inch, is admitted to the pot, causing a pressure of this character to be applied to the vacuum bags and their contents for the short period of about three minutes, previously indicated as sufficient in practice, though a longer period may be employed, if so desired.

Immediately following the application of pressure by the compressed air, the valve 15 is closed, the valve 17 is opened to vent the pot and cold water is admitted by pipe 18 under control of the valve 19, thereby filling the pot and surrounding vacuum bags therein for the purpose of chilling the laminated glass "sandwich" and setting the celluloid or pyroxylin binder. After the pot is filled with water and the cooling accomplished, valve 19 is closed and valve 21 opened, whereupon the water within the pot may drain off to the sewer. The lid of the pot may then be lifted and the contents of the pot removed. The table frames with their associated vacuum bags are then placed upon a convenient table, clamps 24 released and contents of the bags withdrawn, the opening of the bags acting to break the vacuum by permitting air to enter.

The breaking of the vacuum within the bags may be done before opening of the same, by withdrawing the plugs 30. Each bag may then be opened by releasing the clamps 24 and throwing them back from the rubber bag and about their pivotal connections 24d. Thereafter, the completed laminated glass and templets may be withdrawn by pulling upon the ends of the canvas sheet 25a.

In this application I do not claim the specific form of the tray or vacuo-enclosure, nor features directly associated with them, as they form subject matter of a copending application Serial No. 315,977, filed October 30, 1928.

I have described my improved method and means in that particularity which I deem to be the best exposition of my invention and that which I prefer in commercial practice, but I do not restrict or confine myself to the minor or secondary details, as such are susceptible of modification, which may be resorted to as matters of mechanical skill and without a departure from the spirit of the invention.

Having now described my invention, what I claim and desire to secure by Letters Patent is:

1. The herein described method for the manufacture of laminated glass, which consists in assembling a "sandwich" formed of two sheets of glass with an interposed binder capable of being softened by heat and placing the same within an enclosure having flexible walls and forming a partial vacuum within the structure whereby air, vapor and moisture are removed from the "sandwich"; confining the said enclosure and its contents within a closed chamber while subjecting them therein to steam having a sufficiently high temperature to soften the binder and maintaining the "sandwich" in said heated condition and under the direct pressure of the steam until the binder thereof is softened; thereafter subjecting the chamber and enclosure containing the heated "sandwich" to the action of a fluid medium having a pressure sufficient to compress and shape the softened binder material of the "sandwich" closely to the opposing surfaces of the glass sheets thereof; cooling the enclosure and "sandwich" therein; and finally removing the completed "sandwich" from the influence of the vacuum into the normal atmosphere for use as laminated glass; and wherein further, the pressure supplied to the chamber and upon the enclosure containing the "sandwich" is obtained by means of compressed air admitted to chamber.

2. The herein described method for the manufacture of laminated glass, which consists in assembling a "sandwich" formed of two sheets of glass with an interposed binder capable of being softened by heat and placing the same within an enclosure having flexible walls and forming a partial vacuum within the structure whereby air, vapor and moisture are removed from the "sandwich"; confining the said enclosure and its contents within a closed chamber while subjecting them therein to steam having a sufficiently high temperature to soften the binder and maintaining the "sandwich" in said heated condition and under the direct pressure of the steam until the binder thereof is softened; thereafter subjecting the chamber and enclosure containing the heated "sandwich" to the action of a fluid medium having a pressure sufficient to compress and shape the softened binder material of the "sandwich" closely to the opposing surfaces of the glass sheets thereof; cooling the enclosure and "sandwich" therein; and finally removing the completed "sandwich" from the influence of the vacuum into the normal atmosphere for use as laminated glass; and wherein further, the pressure supplied to the chamber and upon the enclosure containing the "sandwich" is obtained by means of a compressed cool gaseous fluid having a pressure of approximately 160 pounds per square inch.

3. Means for the manufacture of laminated glass, which consists of a steam tight chamber; a vacuo-enclosure having flexible walls in which the "sandwich" of which the laminated glass is to be made is placed, said enclosure having a temporarily sealed opening through which the air may be exhausted to provide a vacuum within the enclosure and also having a larger opening through which the enclosure may be charged with the "sandwich"; a supporting tray upon which the enclosure rests in a horizontal position and having clamping means for sealing the charging opening of the vacuo-enclosure, said tray of a size to be received within the steam tight chamber; means for directly supplying steam at a temperature sufficiently high to allow a proper union of the parts composing the "sandwich" and permitting the escape of the water of condensation; means for admitting a fluid medium to the chamber under a pressure sufficient and in excess of the steam pressure to compress the materials of the "sandwich" to form an air tight union between them; and means for cooling the chamber and the enclosure arranged therein containing the "sandwich", whereby the "sandwich" may become highly heated and compressed while in a vacuo and thereafter may be removed for use under ordinary atmospheric conditions; and wherein further, the means for admitting the fluid medium for compressing the materials constituting the "sandwich" comprises devices for compressing air and controllably delivering it into the chamber.

4. Means for the manufacture of laminated glass, which consists of a steam tight chamber; a vacuo-enclosure having flexible walls in which the "sandwich" of which the laminated glass is to be made is placed, said enclosure having a temporarily sealed opening through which the air may be exhausted to provide a vacuum within the enclosure and also having a larger opening through which the enclosure may be charged with the "sandwich"; a supporting tray upon which the enclosure rests in a horizontal position and having clamping means for sealing the charging opening of the vacuo-enclosure, said tray of a size to be received within the steam tight chamber; means for directly supplying steam at a temperature sufficiently high to allow a proper union of the parts composing the "sandwich" and permitting the escape of the water of condensation; means for admitting a fluid medium to the chamber under a pressure sufficient and in excess of the steam pressure to compress the materials of the "sandwich" to form an air tight union between them; and means for cooling the chamber and the enclosure arranged therein containing the "sandwich", whereby the "sandwich" may become highly heated and compressed while in a vacuo and thereafter may be removed for use under ordinary atmospheric conditions; and wherein further, the vacuo-enclosure is also provided with charging and discharging means comprising a thin metallic plate of a length and width substantially corresponding to that of the enclosure, and a continuous flexible sheet of approximately twice the length of the metallic plate for enclosing the "sandwich" within the enclosure after the plate has been removed and to provide means for withdrawing the laminated glass from the enclosure.

5. Means for the manufacture of laminated glass, which consists of a steam tight chamber; a vacuo-enclosure having flexible walls in which the "sandwich" of which the laminated glass is to be made is placed, said enclosure having a temporarily sealed opening through which the air may be exhausted to provide a vacuum within the enclosure and also having a larger opening through which the enclosure may be charged with the "sandwich"; a supporting tray upon which the enclosure rests in a horizontal position and having clamping means for sealing the charging opening of the vacuo-enclosure, said tray of a size to be received within the steam tight chamber; means for directly supplying steam at a temperature sufficiently high to allow a proper union of the parts composing the "sandwich" and permitting the escape of the water of condensation; means for admitting a fluid medium to the chamber under a pressure sufficient and in excess of the steam pressure to compress the materials of the "sandwich" to form an air tight union between them; and means for cooling the chamber and the enclosure arranged therein containing the "sandwich", whereby the "sandwich" may become highly heated and compressed while in a vacuo and thereafter may be removed for use under ordinary atmospheric conditions; and wherein further, a series of vacuo-enclosures are supported one above the other in separated relation by the supporting trays within the chamber and said trays provided with longitudinal side frames extending downwardly and resting upon the side portions of the respective vacuo-enclosures, the latter being formed of flat rubber top and bottom layers connected at their side edges in closely folded flat side portions.

6. In apparatus for producing laminated glass, which consists of a steam tight chamber, automatic means for supplying steam to the chamber at a substantially constant temperature, automatic means for permitting the steam to escape from the chamber at a substantially constant temperature lower than that of the steam supply, means for supplying compressed air at high pressure to the chamber, means for supplying cooling water to the chamber, and valves for controlling the supply and escape of steam and also the individual supply of compressed air and water, combined with a vacuo-enclosure formed of flexible material and supported within the chamber said enclosure provided with clamping means for hermetically sealing it during treatment within the chamber.

In testimony of which invention, I hereunto set my hand.

ARTHUR G. WORRALL.